(12) United States Patent
Hecker

(10) Patent No.: US 7,405,874 B2
(45) Date of Patent: Jul. 29, 2008

(54) MICROSCOPE FOR EPI FLUORESCENCE AND TOTAL INTERNAL REFLECTION MICROSCOPY

(75) Inventor: Andreas Hecker, Asslar (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 11/499,896

(22) Filed: Aug. 7, 2006

(65) Prior Publication Data

US 2007/0035821 A1   Feb. 15, 2007

(30) Foreign Application Priority Data

Aug. 8, 2005   (DE) .................. 10 2005 037 818

(51) Int. Cl.
  *G02B 21/02* (2006.01)
(52) U.S. Cl. .................. 359/381; 359/368; 359/629
(58) Field of Classification Search .................. 359/368, 359/381, 385, 839, 850, 629, 633, 638
  See application file for complete search history.

(56) References Cited

U.S. PATENT DOCUMENTS

| | | | |
|---|---|---|---|
| 4,585,315 A | 4/1986 | Sincerbox et al. | |
| 4,881,802 A | 11/1989 | Stankewitz | |
| 6,011,876 A * | 1/2000 | Kishner | 382/284 |
| 6,504,653 B2 | 1/2003 | Matthae et al. | |
| 6,987,609 B2 | 1/2006 | Tischer et al. | |
| 7,042,638 B2 * | 5/2006 | Gonschor et al. | 359/385 |
| 2002/0097489 A1 | 7/2002 | Kawano et al. | |
| 2003/0058530 A1 | 3/2003 | Kawano | |
| 2004/0001253 A1 | 1/2004 | Abe et al. | |
| 2004/0174523 A1 * | 9/2004 | Uhl et al. | 356/318 |

FOREIGN PATENT DOCUMENTS

| | | |
|---|---|---|
| DE | 101 08 796 A1 | 9/2002 |
| DE | 101 43 481 A1 | 3/2003 |
| DE | 102 17 098 A1 | 11/2003 |
| DE | 103 09 269 A1 | 9/2004 |
| DE | 102 29 935 A1 | 1/2005 |
| WO | WO 2005/029149 A1 | 3/2005 |

* cited by examiner

*Primary Examiner*—Joshua L Pritchett
(74) *Attorney, Agent, or Firm*—Foley & Lardner LLP

(57) ABSTRACT

The invention relates to a microscope for conventional fluorescence microscopy (Epi fluorescence) and for total internal reflection microscopy, including at least one light source (1) for the conventional fluorescence illumination and at least one light source (2) for the evanescent illumination, and including an objective (4), wherein the illuminating light coming from the light sources (1, 2) on different illumination paths (5, 6) enters the objective (4) via a beam combiner (7) and from there is passed to the sample (8), characterized in that the exit pupil of the objective (4) is imaged on the beam combiner (7) and the beam combiner is structured such that it guides the illuminating light used for the conventional fluorescence illumination and the illuminating light used for the evanescent illumination into the objective (4) along beam paths (5, 6) which are geometrically separate from one another, and preferably run parallel or coaxially to one another.

22 Claims, 4 Drawing Sheets

MICROSCOPE FOR EPI FLUORESCENCE AND TOTAL INTERNAL REFLECTION MICROSCOPY

CROSS-REFERENCE TO RELATED PATENT APPLICATIONS

This application is based on and claims the priority benefit of German Patent Application No. DE 10 2005 037 818.8 filed Aug. 8, 2005, the disclosure of which is incorporated herein by reference in its entirety.

BACKGROUND OF THE INVENTION

The present invention relates to a microscope for conventional fluorescence microscopy (epi fluorescence) and for total internal reflection microscopy, comprising at least one light source for the conventional fluorescence illumination and at least one light source for the evanescent illumination, and comprising an objective, where the illuminating light coming from the light sources on different illumination paths enters the objective via a beam combiner and from there is passed to the sample.

SUMMARY OF THE INVENTION

Total internal reflection microscopy uses the refraction behavior of light on transition from an optically thicker to an optically thinner medium. For example, for the transition from cover glass (n1=1.518) to water (n2=1.33) a critical angle of 61° is obtained, the angle of total reflection. Under conditions of total reflection (angle=61°), a standing evanescent wave is formed in the medium having the lower refractive index. The intensity of this wave decreases exponentially with the distance from the interface. As a result, fluorophors further removed from the interface are not excited. The background fluorescence is reduced appreciably. The image contrast is improved and at the same time, the resolution is significantly increased. A prerequisite for using the previously described phenomenon is a sufficiently large difference between the refractive indices of the cover glass and the medium.

A microscope with evanescent illumination of a sample is known from US 2002/0097489 A1. The microscope contains a white light source whose light is passed via a slotted diaphragm through the microscope objective and coupled into the microscope slide carrying a sample for evanescent illumination. The illuminating light propagates in the microscope slide as a result of total internal reflection, the sample only being illuminated in the area of the evanescent field projecting from the microscope slide. Microscopes of this type are known as TIRFM (Total Internal Reflection Fluorescent Microscope). The z-resolution of TIRF microscopes is extraordinarily good as a result of the evanescent field which projects only about 100 nm into the sample.

A high-aperture objective, in particular for TIRF applications, is known from DE 101 08 796 A1. The objective consists of a first lens with a positive refractive power, a second lens with a negative refractive power, wherein the focal length ratio between the two lenses lies in the range of −0.4 to −0.1 and the total refractive power is larger than zero. The objective further includes two positive lenses whose ratio diameter to focal depth is greater than 0.3 and less than 0.6. The objective further includes a negative lens and a converging lens where the negative lens faces the front group and the focal length ratio of the negative lens and the converging lens lies between −0.5 and −2.

An incident illumination arrangement for TIRF microscopy is known from DE 102 17 098 A1. The incident illumination arrangement includes an illumination source which delivers a polarized illuminating light beam during operation, which propagates at an angle to the optic axis and a deflecting device which deflects the illuminating light beam and couples it into the objective parallel to the optic axis. In this incident illumination arrangement it is provided that the illuminating light beam delivered by the illumination source comprises s- and p-polarizations with a phase difference and the deflecting device reflects the illuminating light beam x times, where $x=(n \times 180° - d)/60°$.

A microscope for TIRM (Total Internal Reflection Microscopy) is known from DE 101 43 481 A1. The microscope comprises a microscope housing and an objective. The illuminating light emanating from an illuminating device can be coupled in via an adapter which can be inserted into the microscope housing.

US 2004/0001253 A1 discloses a microscope with an optical illumination system which allows simple switching over between evanescent illumination and reflection illumination. The illumination system includes a laser light source whose light is coupled into an optical fiber. Coupling-out optics are provided to focus the light emerging from the fiber to a rear focal point of the microscope objective. The optical fiber is displaceable in a plane perpendicular to the optic axis of the microscope objective.

A device for coupling light into a microscope is known from DE 102 29 935 A1. Laser light is directed onto the specimen in the light-field diaphragm plane by means of an in-coupling light-conducting fiber. The invention is particularly suitable for the TIRF method.

In scanning microscopy a sample is illuminated with a light beam to observe the detection light emitted by the sample as reflection or fluorescence light. The focus of an illuminating light beam is moved in a sample plane using a controllable beam deflecting device, generally by tilting two mirrors, the axes of deflection usually being perpendicular to one another so that one mirror deflects in the x-direction, the other in the y-direction. The tilting of the mirrors is accomplished, for example, using galvanometer adjusting elements. The power of the detection light coming from the object is measured depending on the position of the scanning beam. The adjusting elements are usually equipped with sensors to determine the current mirror position. In confocal scanning microscopy in particular, an object is scanned in three dimensions with the focus of a light beam.

A confocal scanning microscope generally comprises a light source, focusing optics used to focus the light from the source onto a pinhole diaphragm, the so-called excitation diaphragm, a beam splitter, a beam deflecting device for beam control, microscope optics, a detection diaphragm and the detectors to detect the detection or fluorescence light. The illuminating light is coupled in via a beam splitter. The fluorescence or reflection light coming from the object is returned to the beam splitter via the beam deflecting device, passed through said beam splitter before then being focused on the detection diaphragm behind which the detectors are located. This detection arrangement is known as a descan arrangement. Detection light which does not originate directly from the focus region takes a different light path and does not pass the detection diaphragm so that point information is obtained which results in a three-dimensional image by sequential scanning of the object with the focus of the illuminating light beam. A three-dimensional image is usually achieved by taking image data by layers.

In the microscopes known from the prior art, the evanescent illumination is usually coupled-in within the framework of two-dimensional solutions although the adjusting unit achieved there is always embodied as one-dimensional. Thus, coupling-in is usually carried out by means of so-called neutral dividers, i.e. via a mirror which reflects to a certain extent and otherwise transmits. Coupling-in via a dichroic divider is also known. This comprises a particular mirror which reflects all other wavelengths apart from a specific wavelength. It is also already known to use a polarizing divider for coupling-in. In this case, the lasers for the evanescent illumination (TIRF illumination) and the laser for the conventional epi fluorescence illumination are orthogonally polarized with respect to one another and combined. As a one-dimensional possibility for coupling the necessary radiation source, it is also already known to use small additional mirrors in the illuminating beam path for the epi fluorescence illumination.

The methods and devices known so far for coupling in one or a plurality of radiation sources for evanescent illumination are problematic in practice since restrictions on the specific properties of the radiation source used in each case arise from the type of coupling-in. Coupling-in via a neutral divider has the disadvantage that deteriorations in the performance occur both in the case of the radiation source for the evanescent illumination and also in the case of the radiation source for the epi fluorescence illumination. Coupling-in via a dichroic divider has the disadvantage that a specific wavelength or a specific wavelength range must be specified. If one wishes to change the wavelength within the scope of such a realization, the beam combiner or mirror must also be changed. Coupling-in via a polarizing divider also brings with it the serious disadvantage that all the components used must be designed as polarization-preserving. In addition, using a polarizing divider means dispensing with a further degree of freedom at the radiation sources. Finally, coupling-in by means of small additional mirrors in the illuminating beam path of the epi fluorescence illumination is eliminated in advance because this involves a one-dimensional solution. The additional mirrors also result in partial covering of the epi fluorescence illumination so that this possibility for coupling-in is not acceptable in this respect.

It is now the object of the present invention to configure and further develop a microscope for conventional fluorescence microscopy (epi fluorescence) and for total internal reflection microscopy in such a manner that the evanescent illumination can be coupled-in without the disadvantages known from the prior art. In addition, the coupling-in should be designed in a simple manner and should also allow automatic microscope operation with changing objectives.

Accordingly, the generic microscope is characterized in that the exit pupil of the objective is imaged on the beam combiner and the beam combiner is structured such that it guides the illuminating light used for the conventional fluorescence illumination and the illuminating light used for the evanescent illumination into the objective along beam paths which are geometrically separate from one another, and preferably run parallel or coaxially to one another.

According to the invention it has become known that with a skilful arrangement and configuration of the beam combiner, the evanescent illuminating light source can be coupled in without any losses and restrictions if the exit pupil of the objective is imaged on the beam combiner. Furthermore a particular structuring of the beam combiner is required whereby this jointly guides the illuminating light used for the conventional fluorescence illumination and the illuminating light used for the evanescent illumination into the objective but along beam paths which are geometrically separate from one another. These geometrically separate beam paths either run adjacent to one another, preferably parallel, or they are arranged coaxially to one another. In any case, it is important that as a result of its structure, the beam combiner allows the illuminating light used for the conventional fluorescence illumination and the illuminating light used for the evanescent illumination to be coupled in jointly but along geometrically separate beam paths, without using the properties of the radiation such as wavelength or polarization. In this case, deterioration in the performance does not arise and no restriction to a one-dimensional solution is imposed.

Specifically, the beam combiner comprises a structured mirror, namely a structured sectional mirror. The reflecting mirror surface can be vapor-deposited or produced in some other fashion.

Specifically it is feasible that the beam combiner is disposed on the optic axis between the light source for the evanescent illumination and the objective. Accordingly, the beam combiner comprises an inner reflection region for reflecting the illuminating light used for the fluorescence illumination and an outer transmission region for transmitting the illuminating light used for the evanescent illumination. It is thereby possible to reflect the illumination for the normal fluorescence via the mirror and to position the light source for the evanescent illumination through the mirror in the objective pupil.

In principle, it is also possible for the two axes of the illuminating light sources to be exchanged. Accordingly, the beam combiner can be disposed on the optic axis between the light source for the conventional fluorescence illumination and the objective, the beam combiner then comprising an inner transmission region for the illuminating light used for the fluorescence illumination and an outer reflection region for the illuminating light used for the evanescent illumination. Arbitrary structures or geometries of the respective region of the beam combiner are feasible, and only the geometric separation of the two beam paths for the different types of illumination is important.

As has already been mentioned, the beam combiner can have two regions for achieving the geometrical separation of the two beam paths. The outer region of the beam combiner can directly adjoin the inner region of the beam combiner. It is feasible that the inner region of the beam combiner is embodied as a circular surface and the outer region of the beam combiner is embodied as an annular surface. It is also feasible that the inner region of the beam combiner is embodied as an elliptical surface and the outer region of the beam combiner is embodied as an elliptical annular surface.

Within the scope of a further embodiment, the inner region of the beam combiner can be embodied as an angular surface, preferably as a square surface and the outer region of the beam combiner can be embodied as a suitably matched peripheral angular surface, the outer surface surrounding the inner surface entirely or at least in parts.

Typical samples which are examined by means of total internal reflection microscopy usually occur in aqueous solutions whose refractive index lies above 1.33, i.e. above the refractive index of water. If one is committed to an aperture of, for example, 1.35 for the limit of the two previously specified regions, this means that it is impossible to achieve the maximum attainable penetration depth. As a result of the nonlinear relationship between the penetration depth and the angle of incidence, this difference should not be neglected.

In order to be able to achieve the maximum penetration depth, it is necessary a priori to use a specially designed beam combiner for each refractive index with a matched limit between the regions, which then necessarily results in a switching mechanism between the beam combiners, so that the matching beam combiner can be used for each sample. Alternatively, it is possible to use a beam combiner with a total of three regions, i.e. a type of separating region or transition region is provided between the inner region of the beam combiner and the outer region of the beam combiner. This transition region is partly light-transmitting and partly reflecting. Specifically, the transition region can be embodied, for example, in the sense of a neutral divider with all feasible relationships depending on the application. It is also possible to execute the transition region as a graded-index mirror whose reflectivity increases with the numerical aperture and preferably transmits the evanescent illumination in the outer lying regions. In this respect TIRF is increasingly preferred towards the outside.

At this point, it should be noted that the beam combiner can have an inverted structure compared with that described previously or it can have modifications in form and structure in the configuration of the respective regions.

Furthermore, it is possible to use a beam combiner comprising an outer region which is constructed in the same way as the inner region. In other words, this can comprise a beam combiner provided with three or four regions or zones if the previously discussed transition region is also implemented. The precaution of using the transition region is optional in any case. The outer region has the same condition as the region at the center or in the middle of the beam combiner according to the preceding explanations. This region should be adapted to the objective having the greatest magnification which is to be used to establish the evanescent illumination or the TIRF illumination. Suitably configured beam combiners can be used to set up the sample under epi fluorescence with weakly magnifying objectives and at the same time optimally use the TIRF region. An inverse configuration of the regions is also possible there.

It is fundamentally advantageous if the region or regions for transmitting the evanescent illumination is or are tuned to different objectives. According to the preceding explanations, the outer region can be matched to the objective with the greatest magnification in the case of evanescent illumination. Any other matchings are feasible.

It is quite particularly advantageous if the beam combiner interacts with a diaphragm disposed in the objective, preferably in the vicinity of or in the plane of the objective pupil which has a central region which is nontransmitting for the evanescent illuminating light and transmitting for the returning detection light, and an edge region which is transmitting for the evanescent illuminating light. Matching between the beam combiner and the diaphragm to be allocated to the objective is particularly advantageous in this respect.

Of particular importance is the finding that the position and size of the regions of the beam combiner and thus the beam combiner as a whole should be selected depending on the magnification of the objective. It is also important that the position and size of the regions of the beam combiner and thus the beam combiner as a whole can be selected depending on the refractive index of the solution containing the sample under study or the sample itself. In the light of this finding, it is possible that a beam combiner adapted in the regions is available for every available objective. This means that for optimal usage of the regions of the beam combiner, its own beam combiner is used for each objective and that the beam combiner should be changed every time that the objective is changed. At the same time, it is in turn advantageous if the different beam combiners can be brought into the beam path and positioned there by means of an exchange mechanism, preferably a revolving device. As an alternative to the precaution of a fixed non-switchable beam combiner, there is the more extensive precaution of an intermediate image with variable magnification between the beam combiner and the objective so that the size of the pupil can be adapted to the size of the beam combiner.

With reference to the previously discussed mechanical solution whereby different beam combiners are to be exchanged according to the objectives, it is possible for the microscope to operate automatically whereby the exchange mechanism for the beam combiner is synchronized with an exchange mechanism for the objective for automatic adjustment. It is possible that the two exchange mechanisms are embodied as revolving devices which are operated or activated synchronously to one another.

With reference to the respective light sources, it should be noted that in each case, two or more light sources can also be used simultaneously for the conventional fluorescence illumination and/or the evanescent illumination, where the respective illuminating light can be appropriately coupled in. It is also feasible that in addition to the evanescent illumination, a simultaneously operating laser having the function of a manipulating laser can be used. This manipulating laser can be used for the conventional epi fluorescence excitation.

Various possibilities exist for advantageously configuring and further developing the teaching according to the present invention. For this purpose, reference is made to the following description of preferred exemplary embodiments of the invention with reference to the drawings. Generally preferred configurations and further developments of the teaching are also explained in conjunction with the explanation of the preferred exemplary embodiments of the invention with reference to the drawings.

DETAILED DESCRIPTION OF THE PREFERRED EMBODIMENTS

Figure 1:
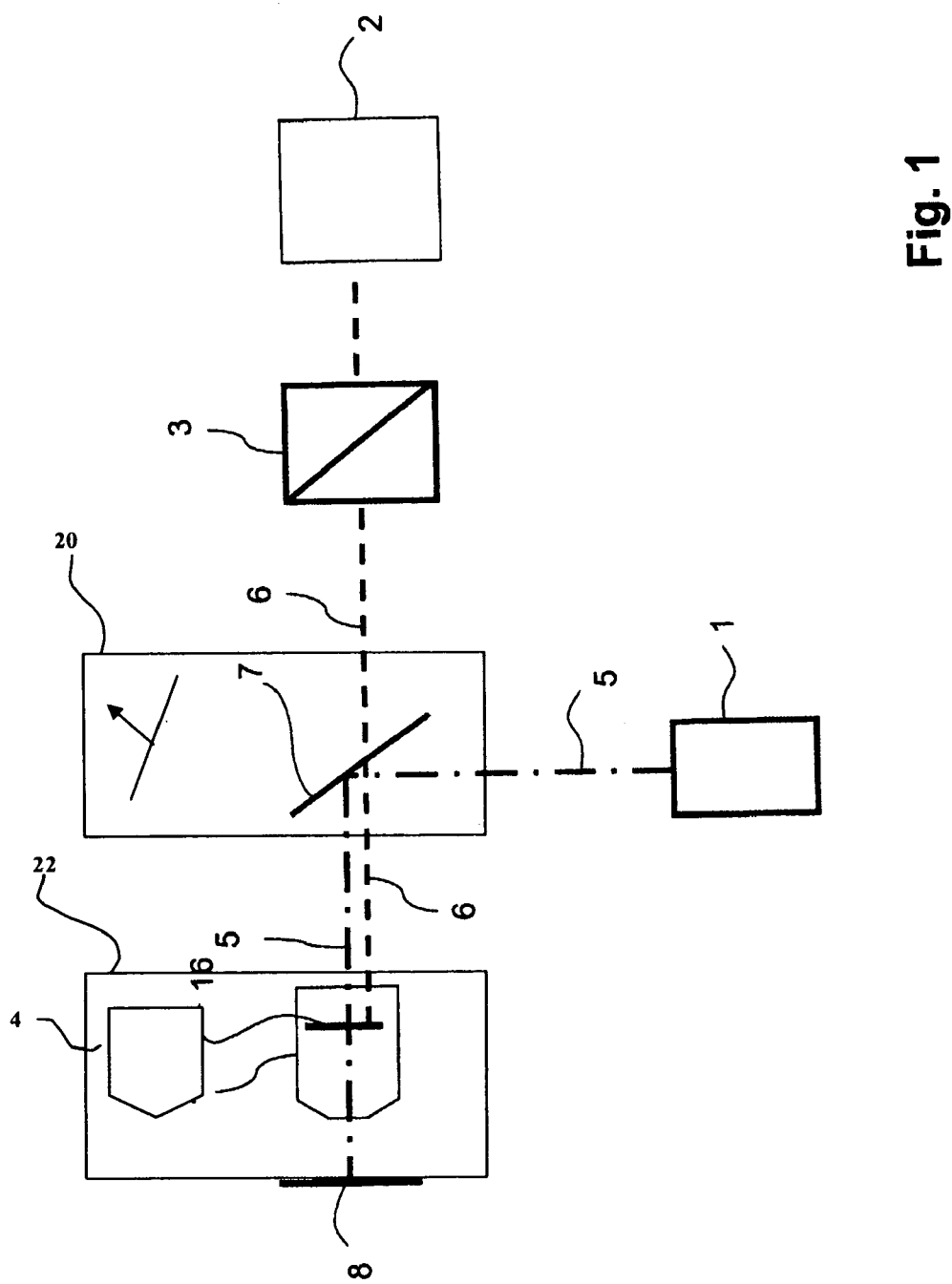
FIG. 1 is a schematic view of the basic course of the illuminating beam path in a microscope according to the invention.

FIG. 1 shows the fundamental structure of a microscope according to the invention which is suitable for conventional fluorescence microscopy (epi fluorescence) and for total internal reflection microscopy. More precisely, FIG. 1 shows the illuminating beam path in relation to the two operating modes. The microscope comprises a light source 1 for the conventional fluorescence illumination and a light source 2 for the evanescent illumination, where a scanner 3 can be provided. Each of the light sources 1 and 2 may comprise at least one light source.

The microscope further comprises an objective 4, wherein the illuminating light coming from the light sources 1, 2 along different illumination paths 5, 6 is passed into the objective via a beam combiner 7 and from there reaches the sample 8.

According to the invention, the exit pupil of the objective 4 is imaged on the beam combiner 7. An exchange mechanism 20, such as a revolving device, may bring in turn a plurality of beam combiners 7 into the beam path. A corresponding exchange mechanism 22 may bring in turn a plurality of objectives 4 into the beam path.

Figure 2:
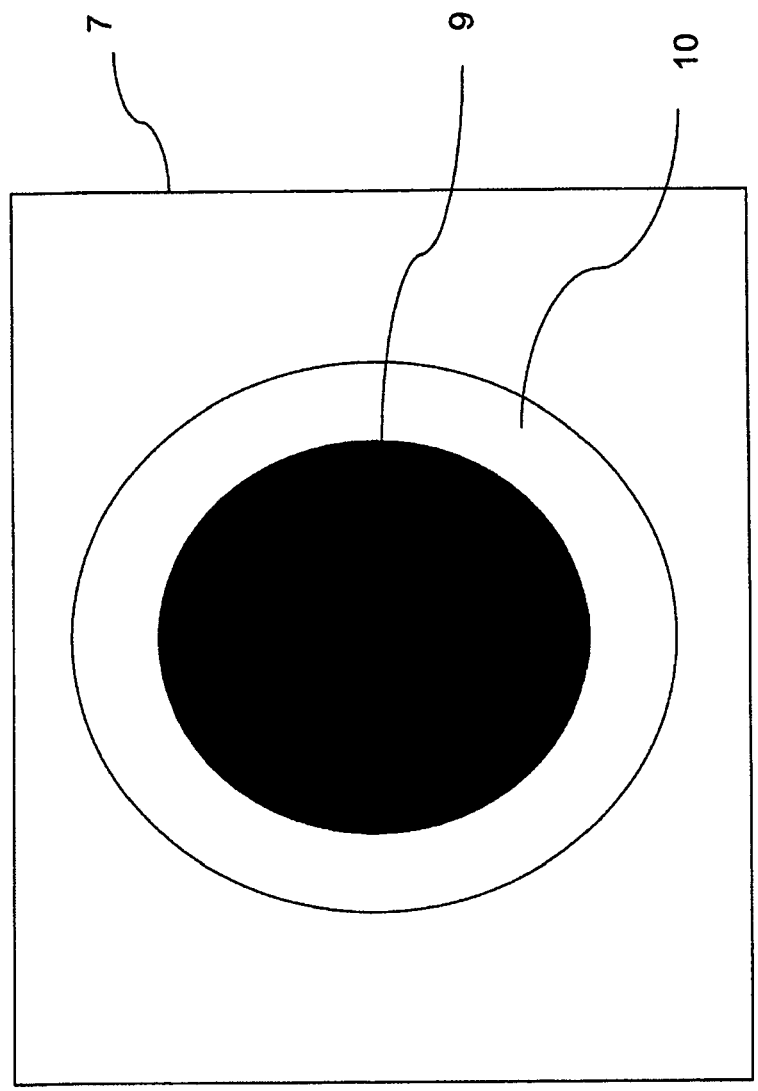
FIG. 2 is a schematic view of a first exemplary embodiment of a beam combiner used in the arrangement according to FIG. 1.
Figure 3:
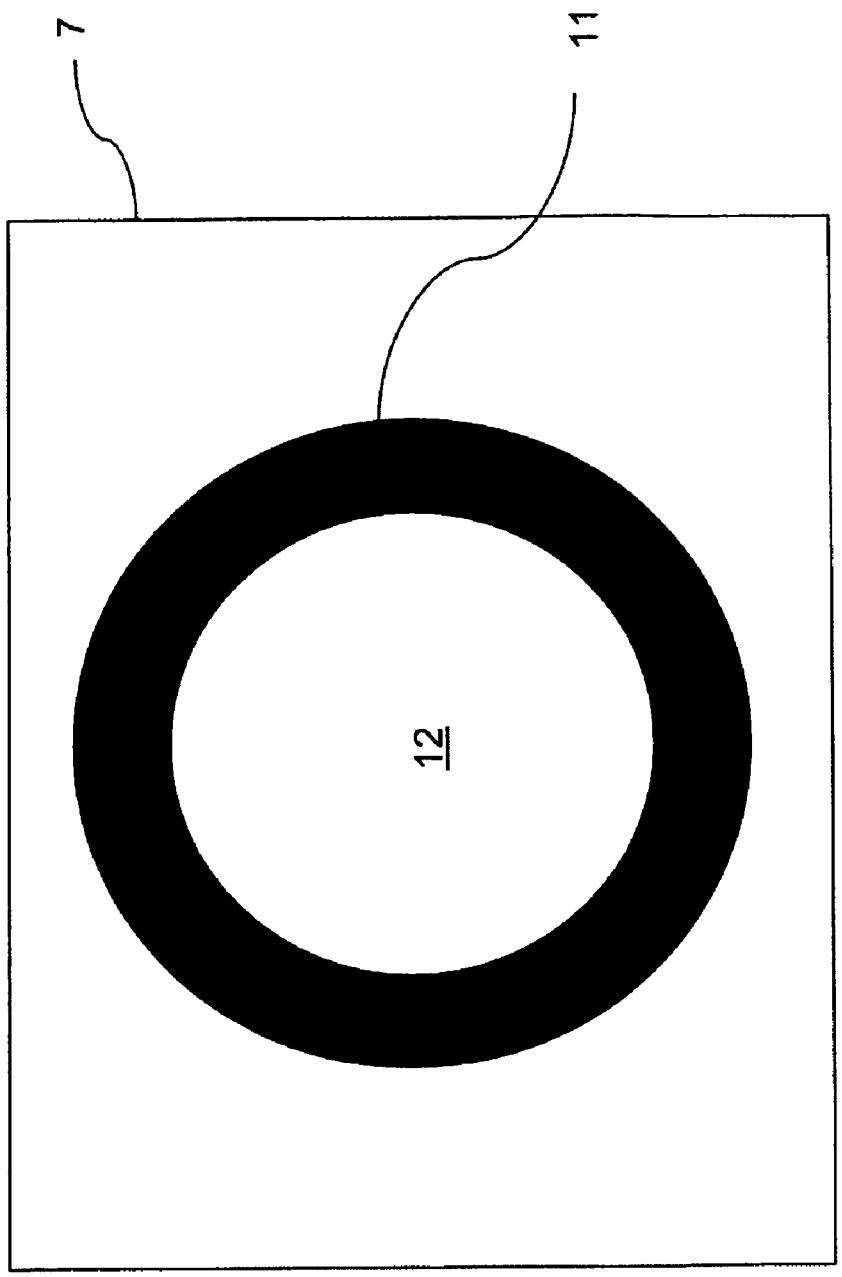
FIG. 3 is a schematic view of a second exemplary embodiment of a beam combiner used in the arrangement according to FIG. 1.
Figure 4:
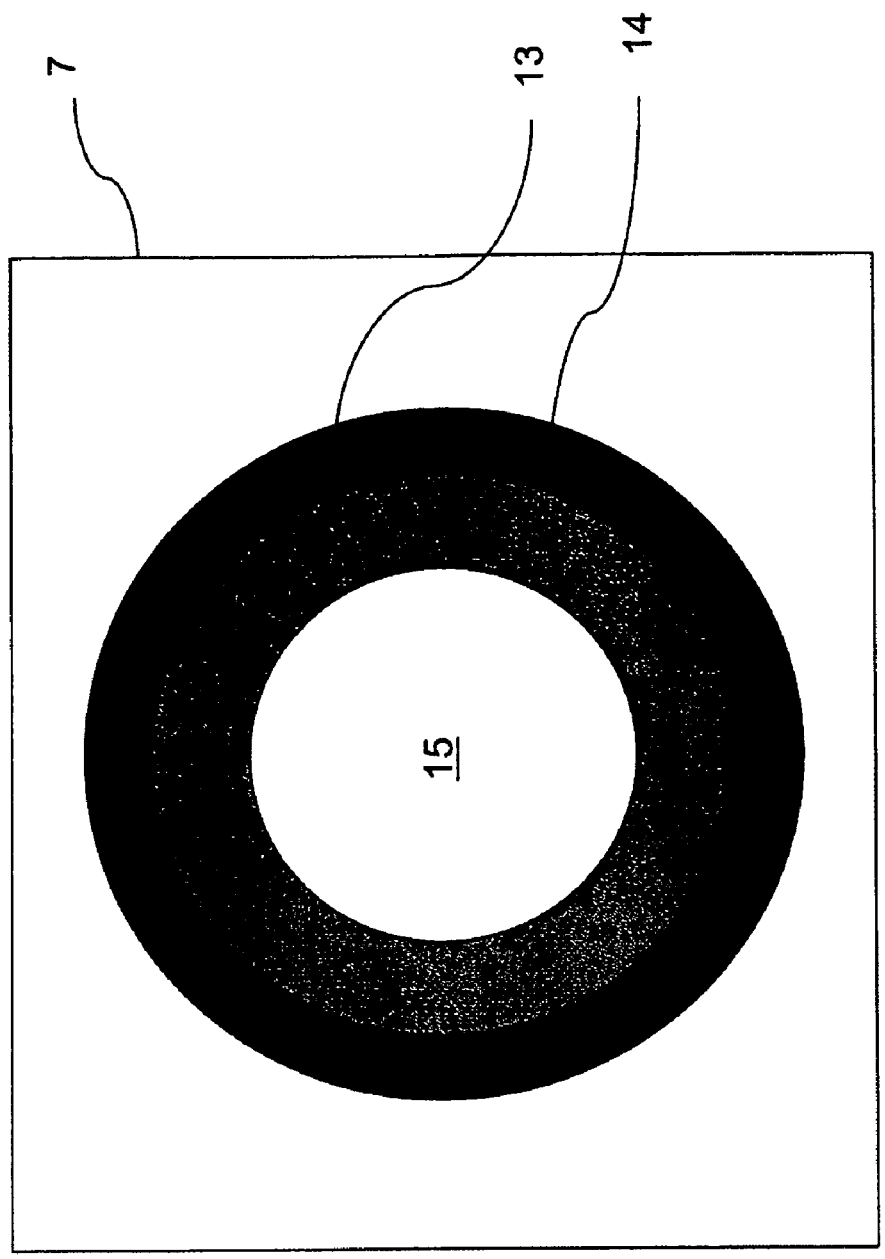
FIG. 4 is a schematic view of a third exemplary embodiment of a beam combiner used in the arrangement according to FIG. 1.

FIGS. 2, 3, and 4 show schematically together with FIG. 1 how the beam combiner 7 is structured such that it guides the illuminating light used for the conventional fluorescence illumination and the illuminating light used for the evanescent illumination into the objective 4 in geometrically separated beam paths 5, 6.

More precisely, the beam combiner 7 is embodied as a structured sectional mirror.

In the exemplary embodiment shown in FIG. 2 the black central region 9 represents the mirrored part of the beam combiner 7 through which the epi fluorescence illumination is applied to the optic axis. The white outer region 10 is transparent to the light and is used to reflect the TIRF illumination and specifically within an arrangement according to FIG. 1.

According to the exemplary embodiment of a beam combiner 7 shown in FIG. 3, the black outer region 11 is mirrored whereby the TIRF illumination is coupled into the beam path. The white central region 12 is light-transmitting and is used to reflect the epi fluorescence. The axes are correspondingly exchanged compared with the diagram in FIG. 1.

FIG. 4 shows a third exemplary embodiment of a beam combiner 7 where a total of three different regions are provided.

The black outer region 13 is mirrored and is used to reflect the TIRF illumination. The adjoining further region, which is designated as a transition region 14 in the general description, is configured as partly reflecting and partly transmitting. The white central region 15 is light-transmitting so that the epi fluorescence illumination can be coupled in through this region.

With reference to the features which cannot be deduced from the figures, reference should be made to the general part of the description to avoid repetitions.

Finally it should be noted that the exemplary embodiments discussed hereintofore merely serve to describe the claimed teaching but do not restrict this to the exemplary embodiments.

REFERENCE LIST

1 Light source (epi fluorescence illumination)
2 Light source (evanescent illumination)
3 Scanner
4 Objective
5 Illumination path, beam path (for the epi fluorescence illumination)
6 Illumination path, beam path (for the evanescent illumination)
7 Beam combiner
8 Sample
9 Central region, inner reflection region (mirrored, FIG. 2)
10 Outer region, outer transmission region (light-transmitting, FIG. 2)
11 Outer region, outer reflection region (mirrored, FIG. 3)
12 Outer region, inner transmission region (light-transmitting, FIG. 3)
13 Outer region, outer reflection region (mirrored FIG. 4)
14 Transition region (partly mirrored, partly light-transmitting, FIG. 4)
15 Central region, central transmission region (light-transmitting, FIG. 4)

What is claimed is:

1. A microscope for epi fluorescence and for total internal reflection microscopy, comprising:
   at least one light source for fluorescence illumination;
   at least one light source for evanescent illumination;
   an objective;
   a beam combiner,
   wherein the illuminating light coming from the light sources on different illumination paths enters the objective via the beam combiner and is passed to a sample,
   wherein an exit pupil of the objective is imaged on the beam combiner and the beam combiner is structured such that it guides the illuminating light used for the fluorescence illumination and the illuminating light used for the evanescent illumination into the objective along beam paths which are geometrically separate from one another,
   an exchange mechanism for the beam combiner configured to bring the beam combiner out of a plurality of beam combiners and into the beam path; and
   an exchange mechanism for the objective configured to bring the objective out of a plurality of objectives and into the beam path in synchronization with the exchange mechanism for the beam combiner.

2. A microscope according to claim 1, wherein the beam combiner as has a structured sectional mirror.

3. A microscope according to claim 2, wherein a reflecting mirror surface of the mirror is vapor-deposited.

4. A microscope according to claim 1, wherein the beam combiner is disposed on the optic axis between the light source for the evanescent illumination and the objective and comprises an inner reflection region for reflecting the illuminating light used for the fluorescence illumination and an outer transmission region for transmitting the illuminating light used for the evanescent illumination.

5. A microscope according to claim 4, wherein the outer transmission region of the beam combiner directly adjoins the inner reflection region of the beam combiner.

6. A microscope according to claim 4, wherein the inner reflection region of the beam combiner has a circular surface and the outer transmission region of the beam combiner has an annular surface.

7. A microscope according to claim 4, wherein the inner reflection region of the beam combiner has an elliptical surface and the outer transmission region of the beam combiner has an elliptical annular surface.

8. A microscope according to claim 4, wherein the inner reflection region of the beam combiner has an angular surface, and the outer transmission region of the beam combiner is has a suitably matched peripheral angular surface.

9. A microscope according to claim 4, wherein a separating region or transition region is formed between the inner reflection region of the beam combiner and the outer transmission region of the beam combiner.

10. A microscope according to claim 9, wherein the transition region is formed between the inner reflection region of the beam combiner and the outer transmission region of the beam combiner, wherein the transition region is partly transmitting and partly reflecting.

11. A microscope according to claim 9, wherein the transition region is formed between the inner reflection region of the beam combiner and the outer transmission region of the beam combiner, wherein the transition region comprises a neutral divider.

12. A microscope according to claim 9, wherein the transition region is formed between the inner reflection region of the beam combiner and the outer transmission region of the beam combiner, wherein the transition region has a graded-index mirror whose reflectivity increases with the numerical aperture and in which the evanescent illumination is transmitted in the outer lying regions.

13. A microscope according to claim 1, wherein the beam combiner is disposed on the optic axis between the at least one light source for the fluorescence illumination and the objective, and comprises an inner transmission region for the illuminating light used for the fluorescence illumination and an outer reflection region for the illuminating light used for the evanescent illumination.

14. A microscope according to claim 1, wherein the beam combiner interacts with a diaphragm disposed in the objective, in the vicinity of or in the plane of the objective pupil which has a central region which is nontransmitting for the evanescent illuminating light and transmitting for the returning detection light, and an edge region which is transmitting for the evanescent illuminating light.

15. A microscope according to claim 1, wherein the position and size of the regions of the beam combiner can be selected depending on the magnification of the objective.

16. A microscope according to claim 1, wherein the position and size of the regions of the beam combiner can be selected depending on the refractive index of a solution containing the sample under study or the sample itself.

17. A microscope according to claim 1, wherein in each case two or more light sources are provided for the conventional fluorescence illumination and the evanescent illumination.

18. A microscope according to claim 1, further comprising a simultaneously operating manipulating laser.

19. A microscope according to claim 1, wherein the exit pupil of the objective is imaged on the beam combiner and the beam combiner is structured such that it guides the illuminating light used for the fluorescence illumination and the illuminating light used for the evanescent illumination into the objective along beam paths which run parallel or coaxially to one another.

20. A microscope for epi fluorescence and for total internal reflection microscopy, comprising:
   at least one light source for fluorescence illumination;
   at least one light source for evanescent illumination;
   an objective; and
   a beam combiner,
   wherein the illuminating light coming from the light sources on different illumination paths enters the objective via the beam combiner and is passed to a sample,
   wherein an exit pupil of the objective is imaged on the beam combiner and the beam combiner is structured such that it guides the illuminating light used for the fluorescence illumination and the illuminating light used for the evanescent illumination into the objective along beam paths which are geometrically separate from one another,
   wherein the beam combiner is disposed on the optic axis between the light source for the evanescent illumination and the objective and comprises an inner reflection region for reflecting the illuminating light used for the fluorescence illumination, an outer transmission region for transmitting the illuminating light used for the evanescent illumination, and an inner transmission region for transmitting the illuminating light used for the evanescent illumination,
   wherein the inner and outer transmission regions for transmitting the evanescent illumination are tuned to different objectives.

21. A microscope according to claim 20, wherein the outer region is matched to the objective with the greatest magnification in the case of evanescent illumination.

22. A microscope according to claim 21, wherein the exit pupil of the objective is imaged on the beam combiner and the beam combiner is structured such that it guides the illuminating light used for the fluorescence illumination and the illuminating light used for the evanescent illumination into the objective along beam paths which run parallel or coaxially to one another.

* * * * *